(12) United States Patent
Bouchet

(10) Patent No.: US 11,616,660 B2
(45) Date of Patent: Mar. 28, 2023

(54) SERIAL TIME TRIGGERED DATA BUS

(71) Applicant: Ratier-Figeac SAS, Figeac (FR)

(72) Inventor: Arnaud Bouchet, Planioles (FR)

(73) Assignee: Ratier-Figeac SAS, Figeac (FR)

( * ) Notice: Subject to any disclaimer, the term of this patent is extended or adjusted under 35 U.S.C. 154(b) by 0 days.

(21) Appl. No.: 17/512,598

(22) Filed: Oct. 27, 2021

(65) Prior Publication Data

US 2022/0158866 A1    May 19, 2022

(30) Foreign Application Priority Data

Nov. 16, 2020 (EP) .................................. 20306389

(51) Int. Cl.
*H04L 12/40* (2006.01)

(52) U.S. Cl.
CPC .............. *H04L 12/40084* (2013.01); *H04L 12/40013* (2013.01); *H04L 12/4015* (2013.01); *H04L 12/40097* (2013.01)

(58) Field of Classification Search
CPC ......... H04L 12/40084; H04L 12/40013; H04L 12/40097; H04L 12/4015
See application file for complete search history.

(56) References Cited

U.S. PATENT DOCUMENTS

| | | | |
|---|---|---|---|
| 4,409,656 A | 10/1983 | Andersen et al. | |
| 4,646,232 A | 2/1987 | Chang et al. | |
| 5,005,151 A | 4/1991 | Kurkowski | |
| 5,572,686 A * | 11/1996 | Nunziata | G06F 13/362 710/241 |
| 5,991,817 A | 11/1999 | Rowett et al. | |
| 6,105,094 A * | 8/2000 | Lindeman | G06F 13/362 710/240 |
| 7,907,628 B2 | 3/2011 | Hall et al. | |
| 8,451,860 B2 | 5/2013 | Kinstler | |
| 9,749,256 B2 | 8/2017 | Bobrek | |
| 10,382,222 B2 * | 8/2019 | Beckmann | H04L 12/40039 |
| 2007/0022238 A1 * | 1/2007 | Metsker | G06F 13/364 710/113 |
| 2007/0101206 A1 * | 5/2007 | Brabant | G06F 11/0757 714/E11.003 |
| 2017/0149518 A1 * | 5/2017 | Hartlmueller | H04L 12/40032 |
| 2017/0163543 A1 * | 6/2017 | Wang | H04L 47/215 |

FOREIGN PATENT DOCUMENTS

WO    WO-2019030214 A1    2/2019

* cited by examiner

*Primary Examiner* — Henry Tsai
*Assistant Examiner* — Christopher A Daley
(74) *Attorney, Agent, or Firm* — Locke Lord LLP; Joshua L. Jones; Gabrielle L. Gelozin

(57) ABSTRACT

A serial communications bus system comprising a plurality of end users arranged to transmit data on a common data bus, each end user provided with a bus arbiter, physically separate from the respective end user, configured to define, for that end user, a cycle of transmission enable intervals whereby the end user may transmit data on the data bus and transmission disable intervals whereby the end user may not transmit data on the data bus.

13 Claims, 6 Drawing Sheets

SERIAL TIME TRIGGERED DATA BUS

CROSS REFERENCE TO RELATED APPLICATIONS

This application claims priority to and the benefit of European Patent Application No. EP20306389.6, filed Nov. 16, 2020, the entire content of which is incorporated herein by reference.

TECHNICAL FIELD

The present disclosure is concerned with serial data communication and, more specifically, a data bus such as, but not exclusively, an avionics bus, using a serial time triggered transmission protocol.

BACKGROUND

There are many areas where various devices and users have to transmit and receive data over a data communications network. Conventionally different devices or end users would have a dedicated data bus for transmitting and/or receiving their own data and the data buses could be connected into a network via gateways.

In more recent developments, in order to reduce the number of buses, multiplexing protocols have been developed that allow different users to communicate on the same bus. Time multiplexing protocols allow different users/devices to transmit on the same data bus with each user transmitting their data in a specially assigned time slot. Time multiplexing allows a deterministic communication and is a key characteristic in critical systems. The receiver receives serial data and the data is provided in packets so that, on decoding the serial data stream, it is possible to identify from which of the transmitters or users a given data packet was transmitted.

Multiplexing and serial data transmission is useful particularly where it is important to minimise size and weight of systems and networks such as in aircraft. In aircraft the various devices or end users communicate over an avionics platform. There is a desire, in aircraft, to reduce the overall number of cables in use, which means that communication uses multiplexing protocols. The desire to reduce the number of cables is also apparent in other fields.

Although there is generally a desire to minimise the number of buses and, hence, cables, it is also vital in data communication that the data is accurate, can be properly decoded and assigned to the correct end user and that the data is not corrupted. Multiplexing solutions to ensure that the communication system complies with critical requirements have been developed, such as Avionics Full-Duplex Switched Ethernet, AFDX, which is a data network for safety-critical applications based on Ethernet technology using commercial off-the-shelf components (COTS) or time triggered controller-area-network (TTCAN). These known solutions, however, use very specific protocols, components and/or physical links and require specific COTS and so cannot be easily implemented into existing communication networks.

There is a need for a simple serial data communication bus that can be easily implemented without special data transmission protocols or specific COTS.

SUMMARY

According to one aspect, the disclosure provides a serial communications bus system comprising a plurality of end users arranged to transmit data on a common data bus, each end user provided with a bus arbiter, physically separate from the respective end user, configured to define, for that end user, a cycle of transmission enable intervals whereby the end user may transmit data on the data bus and transmission disable intervals whereby the end user may not transmit data on the data bus.

The cycle is controlled by one or more timers in the arbiter, for example the cycle is controlled by a first timer to time the disable interval and a second timer to time the activation interval.

According to a second aspect, there is provided a method of serial data communication for time multiplexed transmission of data from a plurality of end users, whereby, for each end user, a respective associated arbiter determines a cycle of transmission enable intervals whereby the end user may transmit data on the data bus and transmission disable intervals whereby the end user may not transmit data on the data bus.

The system and method or particularly, but not exclusively, useful for avionics.

BRIEF DESCRIPTION OF THE DRAWINGS

Preferred embodiments will now be described, by way of example only, with reference to the drawings, wherein.

DETAILED DESCRIPTION

The disclosure provides a simple serial bus that provides serial transmission of data from several end users connected to the bus using a time triggering mechanism that does not rely on one of the end users having a time master function or on any synchronization frame. Furthermore, the system does not require any specific COTS components.

The system of this disclosure thus allows multiplexed data transmission on the same hardware bus i.e. on a common wire pair between an end user 20 and a bus transceiver 100. Because there is no requirement for one of the end users to act as a master device in the time triggering mechanism, the system is not liable to complete loss of the bus or the need for complete reconfiguration in the event that the master device fails.

The system of this disclosure provides the time triggering by means of a simple bus arbiter that is associated with but physically separate from the end user. The function of the arbiter is to enable or disable transmission of data on the data bus by the end user. The arbiter does not regulate reception 300 of data on the bus by the end user and so even when transmission is disabled, the end user can still receive data.

Figure 1:
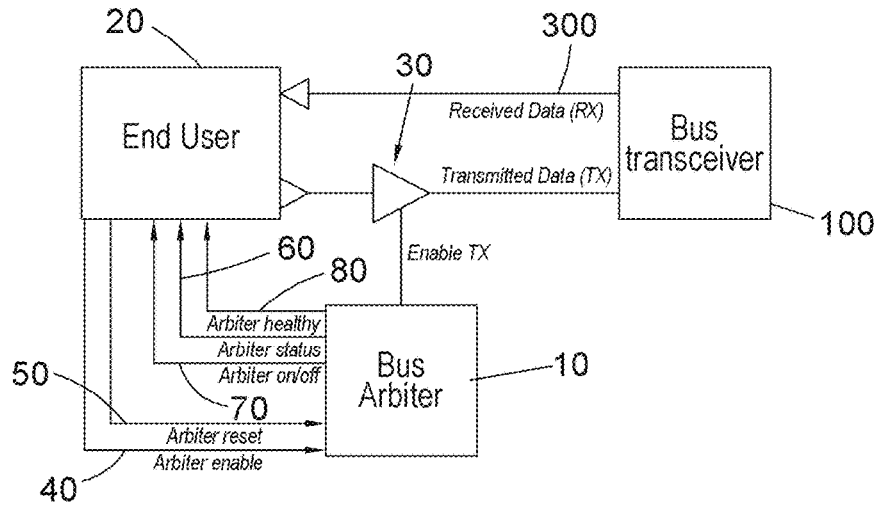
FIG. 1 is a simple block diagram of a system according to the disclosure.

The basic operation of the system will be described first with reference to FIG. 1.

The bus arbiter 10 cycles between two time intervals—an activation interval during which the end user 20 can transmit data onto the bus 30, and a deactivation interval during which the end user is not permitted to transmit on the bus. These intervals may be controlled by means of timers in the arbiter 10. A first timer (not shown) times the deactivation interval. Once this time has elapsed, a second timer (not shown) may time the activation interval for the end user to transmit data on the bus. This continues in a deactivation/activation cycle so long as the arbiter is on or enabled. The intervals are set in, and controlled by, the independent arbiter and are not under the control of the end user.

The end user is only able to enable 40 the bus arbiter so that its activation interval/deactivation interval cycle can start. If the end user does not enable the arbiter, no transmission at all is possible by the end user.

The end user is also able to reset 50 the arbiter. If the end user sends a reset signal 50 to the arbiter, the arbiter disables transmission capability, and resets all counters while starting a new transmission cycle.

The arbiter communicates with the end user 20 by sending a signal 60 indicating whether the bus arbiter enables (i.e. is in the activation interval) or disables (deactivation) transmission. The bus arbiter may also send a signal 70 to the end user indicating whether the arbiter is available and started, Optionally, the bus arbiter may also send a signal 80 providing information to the end user as to the health of the bus arbiter.

The signals described above are example of control /status signals that can be exchanged between the end user and the bus arbiter. Other signals can be used for additional functionalities between the end user and the arbiter, with respect to fundamental law that only the arbiter may manage the activate/deactivate cycle and that end user itself can never activate transmission on the bus.

Figure 2:
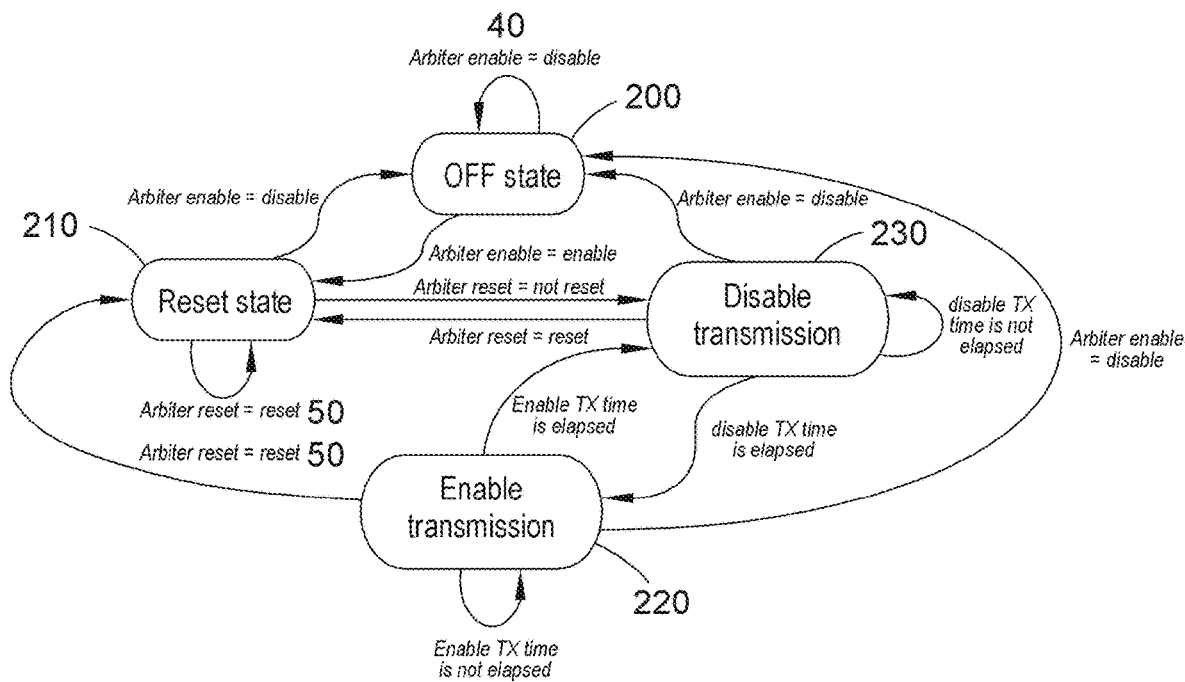
FIG. 2 is a simplified state diagram of the arbiter of FIG. 1

FIG. 2 describes part of the arbiter state machine. If the arbiter is in the OFF state 200, which may be due to the end user signal 40 set to disable, or not set to enable, no transmission is possible. The end user can send an enable signal 40 to reset the arbiter to the reset state 210. The end user can also directly send a reset signal 50 to the arbiter.

The arbiter may be in the activation state i.e. set to enable transmission if the enable timer is still running and/or if the disable/deactivation timer elapses. In the enable state, the end user can reset 50 or disable 40 the arbiter to put it in the OFF state 200.

The arbiter may be in the disable transmission state 230 because the deactivation timer has not elapsed or if the activation timer has elapsed.

As can be seen from FIG. 2, the end user cannot force transmission to be allowed, but can only disable or reset the transmission itself.

It can also be noticed in FIG. 2. that, according to implementation, the OFF state and the Reset state could be merged.

Figure 3:
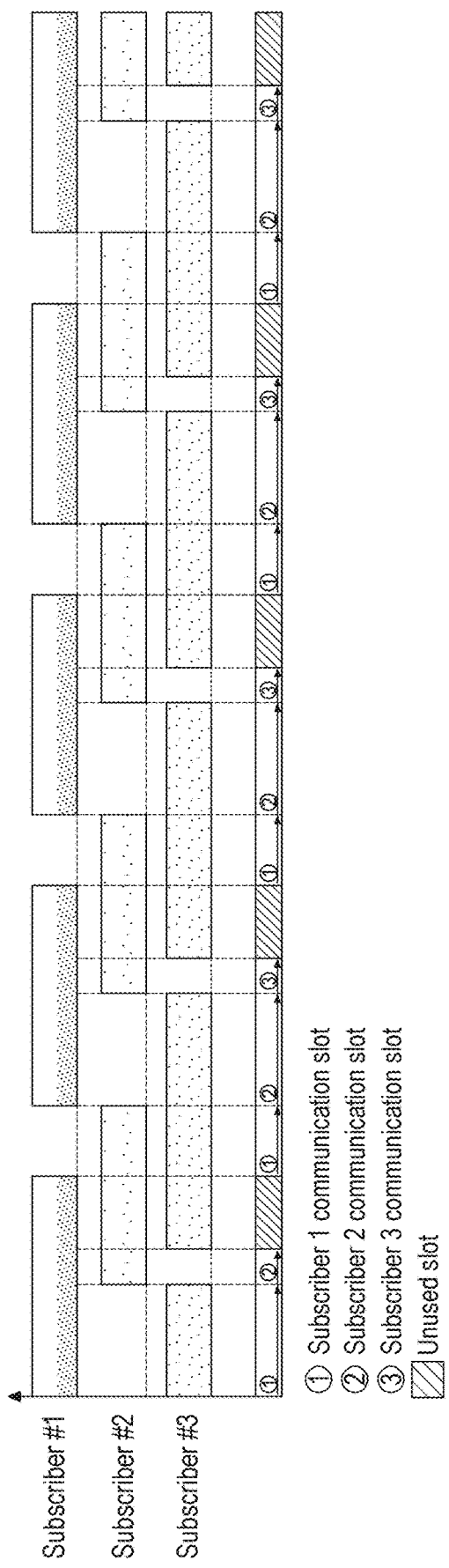
FIG. 3 shows a bus communication overview for a first example.

FIG. 3 shows an overview of bus communication for three end users transmitting in time slots on a common bus, each end user having a cycle of 'transmission disabled' and 'enabled' time slots set by its arbiter.

FIG. 3 shows an ideal case scenario where all three end users are synchronous.

It is more common for the various end users to be asynchronous and to start at different times and/or for the clocks to have different levels of accuracy and/or to have different responses to temperature etc.

Figure 4:
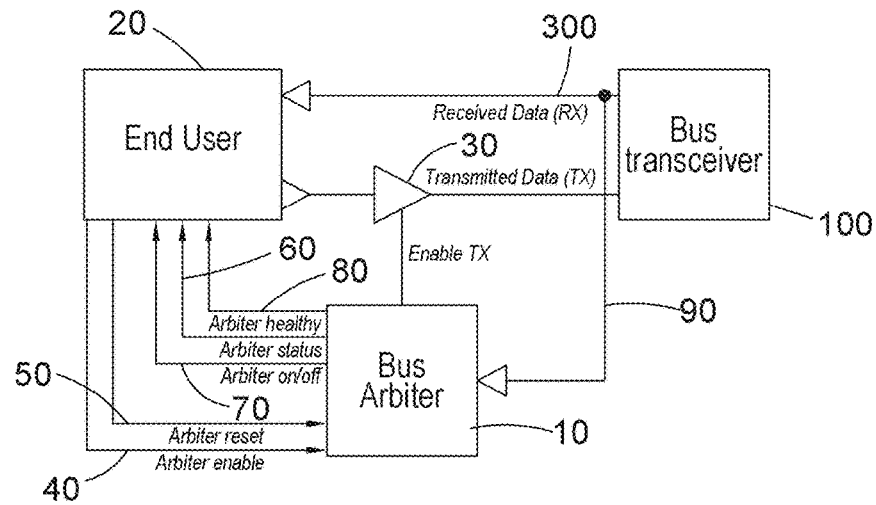
FIG. 4 is a simple block diagram of another example of a system according to the disclosure.
Figure 5:
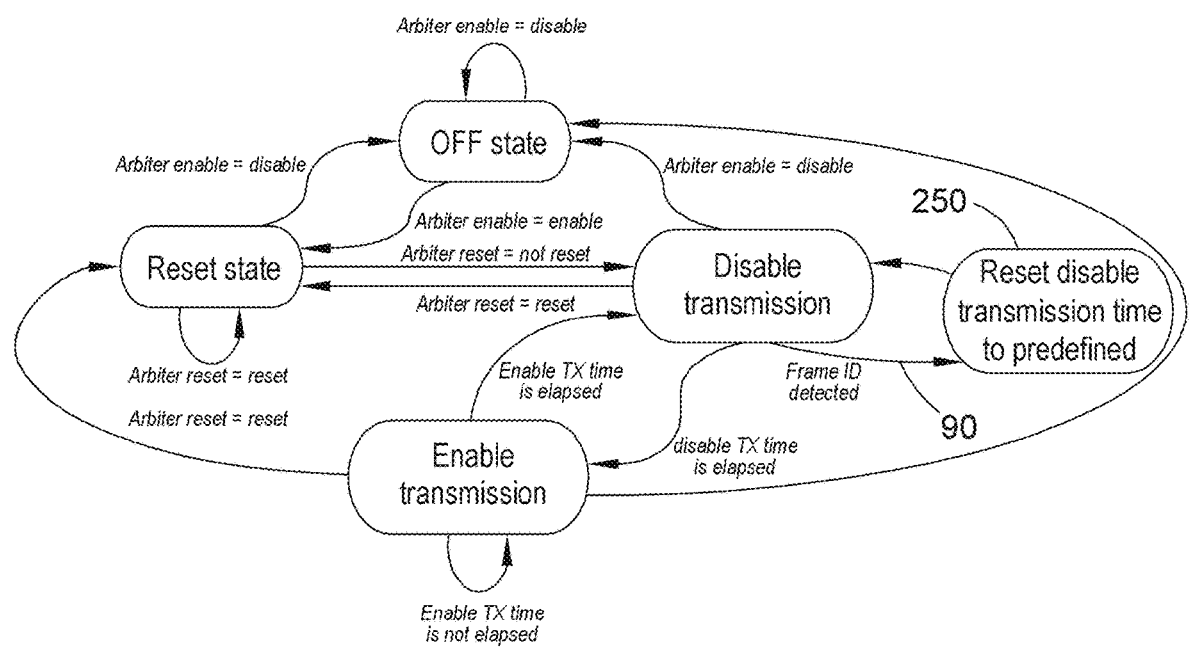
FIG. 5 is a more complete state diagram of the arbiter of FIG. 4
Figure 6:
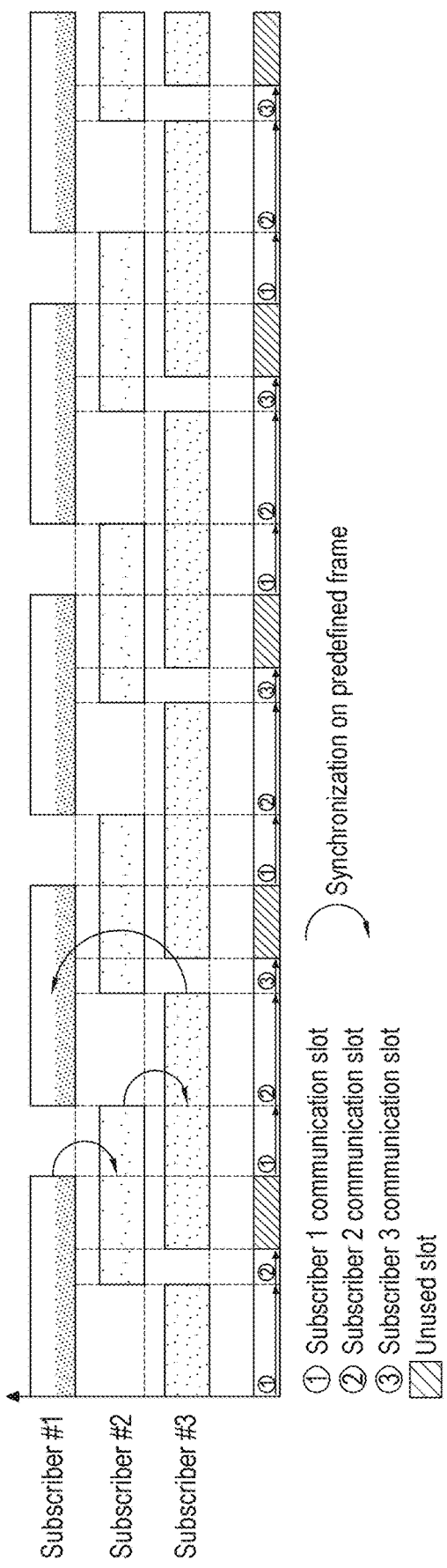
FIG. 6 shows a bus communication overview for the example of FIG. 4.

In an improvement on the system described above, to take into account that not all end users are likely to be synchronous, the system may include an additional functionality as described with reference to FIGS. 4 to 6. The parts of FIG. 4 that are the same as for the example described above have the same reference numbers as in FIG. 1.

In this variation, the end user and the arbiter monitor or 'listen to' data being exchanged on the bus, at line 90. When the arbiter detects a pre-registered frame identifier, described further below, it will automatically reset its internal disable transmission counter to a pre-defined value 'read'. This enables the arbiter to not necessarily restart its counter from zero so as to optimise the bandwidth occupation. This is indicated by state 250 in the state machine of FIG. 5, which is otherwise the same as that of FIG. 2. This function thus enables each end user to synchronise to the others as can be seen in the overview of FIG. 6 which shows, by means of arrows, when the arbiters synchronise on detection of a pre-defined frame in the transmission packet.

The system may also have to deal with the situation that one of the end users is lost or drops out. To avoid this shifting the synchronisation of the whole system, an arbiter may also have the functionality of being able to be reset by more than one identifier such that it responds to different pre-determined identifiers with different reset values.

Another consideration is that different end users may wake up or start up at different times during already established transmissions between other users and regardless of when the user wakes up, it needs to fit into the transmission timing of the other users. The synchronisation feature may also help to achieve the joining of a new user into an established transmission.

Existing mechanisms may also be used to prevent bus electrical contention e.g. by using a transceiver that can handle such contention such as a CAN bus driver or by adding jitter to an inactive transmission delay to allow the arbiter to detect bus contention and to prevent transmission in the case of detected contention.

As mentioned above, to achieve synchrony, the arbiter is able to detect a predetermined identifier. When transmission is enabled for a given end user, that user will transmit a frame of data composed of several fields. For example, a frame may include an Identifier Field comprising, say, 16 bits, followed by the Data Field, comprising e.g. 8 to 64 data bits. This may be followed by a Cyclic Redundancy Check (CRC) field of 16 bits and then an End of Frame field of, say, 8 bits.

In the case of an active end user (discussed further below) the identifier is generated by the end user or may be generated by the bus arbiter and received by the bus arbiter. In the case of a passive end user, the identifier is generated by the bus arbiter. Each active end user will use the data in the identifier field to determine whether it has to deal with the frame.

The Identifier Field may include an identifier code followed by control bits which inform the active end user if the frame sender is an active or passive user, and may also include 'payload' bits to inform the receiving end user how many bits of data it should expect to receive in the following Data Field. The Data Field will have between 1 and 8 bits per data word.

The CRC field is only needed in the frame from an active end user. The End of Frame Field is a set code e.g. 101000110.

As described above, the system can include active and/or passive end users. Each user has an associated bus arbiter. Active users can initiate bus exchanges and can handle and process received data frames. An active user could be, for example, a microcontroller.

Figure 7:
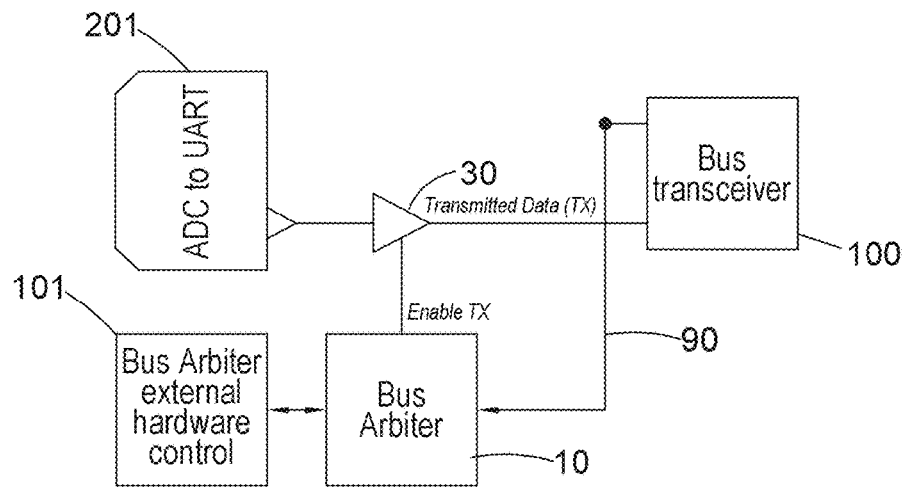
FIG. 7 is a simple block diagram of a passive end user.

A passive end user, e.g. a sensor, only sends data and is not able to treat or process incoming messages. An example of a passive end user is shown in FIG. 7. This shows, by way of example, a smart sensor with a sensor interface realised by an analog to digital converter (ADC) 201. An analog value returned by a physical sensor e.g. a temperature or force sensor, is digitised by the ADC 201 and transmitted on the bus 30. The bus arbiter 10 manages the timing of the bus communication as described above. This figure also shows the bus arbiter hardware control 101.

In some situations, the end user might be slower than its arbiter time slots and so the end user may not have its data ready for transmission when its arbiter is in the activation interval or the end user may me operating asynchronously to the arbiter cycle. The end user may, therefore, have data for transmission that does not arrive at the time the slot for its transmission arrives. The system of this disclosure may be modified to handle such situations by providing a data buffering functionality.

The simplest way to handle the problem is by using a manual transmission signal from the UART interface of the end user. This signal may be driven by the bus arbiter to start transmission, while access is granted, when the data is available. The signal may be provided by any known suitable component.

Figure 8:
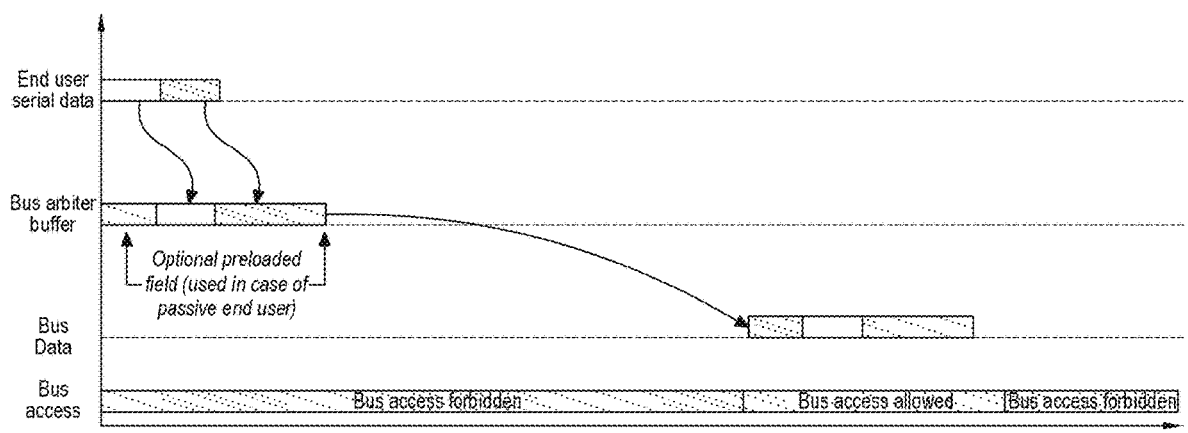
FIG. 8. Is a time line where buffering is provided.

An alternative solution is that the bus arbiter may implement an internal buffer in order to control data transmission when bus access is gained. This then stored the data from the end user until transmission is allowed. FIG. 8 shows an example of the timing using such buffering.

The bus arbiter of this disclosure will have a simple structure and can be implemented using any available small programmable component or microcontroller and does not require and special or specific component.

Figure 9:
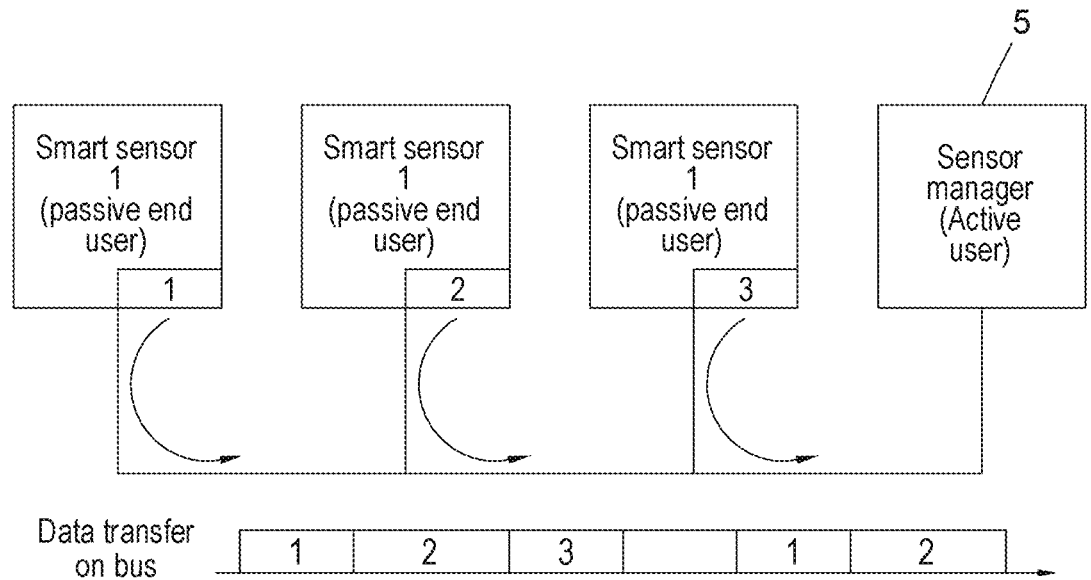
FIG. 9 shows an example of implementation of the bus of this disclosure.

The bus according to this disclosure may be used, for example, to network several smart sensors on a single communication bus as shown in FIG. 9, whereby three passive end users—here smart sensors 1, 2 and 3 and one active user 5—all communicate using the same data bus, where the timing of transmission from each user is controlled by its own bus arbiter.

Figure 10:
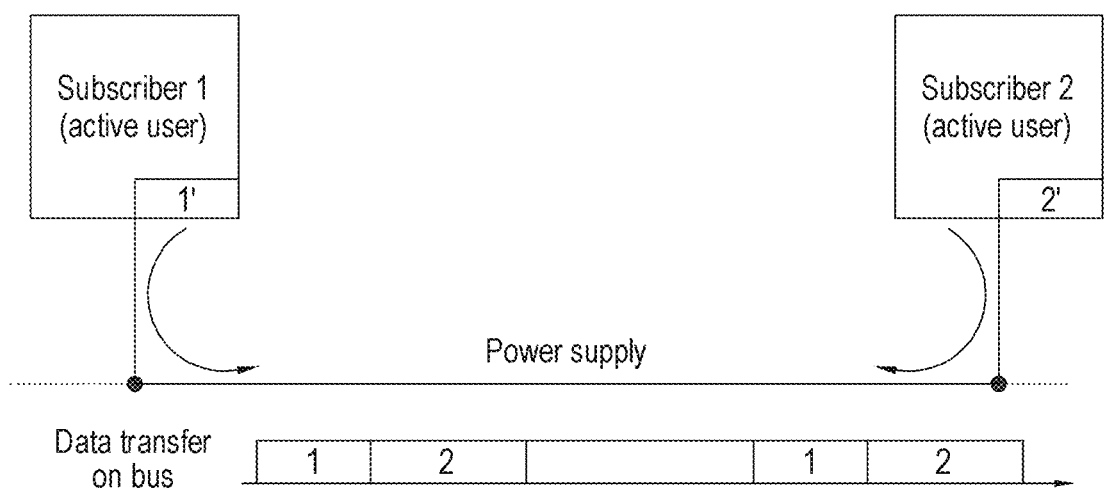
FIG. 10 shows another example of implementation of the bus of this disclosure.

In another example, shown in FIG. 10, several end users 1', 2' may communicate, using the same bus arbiter timing control principles, on a power supply bus bar 6.

The time triggered bus described in this disclosure offers a low cost, simple system for multiplexed data transmission which meets the criteria of critical applications such as avionics, e.g. is deterministic, compliant and robust to failure. The system does not require specific COTS or any complex communication protocols. The system supports both passive and active end users and can be modified to handle different timing scenarios.

The invention claimed is:

1. A serial communications bus system, comprising:
a plurality of end users arranged to transmit data on a common data bus, each end user provided with a bus arbiter, physically separate from the respective end user, configured to define, for that end user, a cycle of transmission enable intervals, whereby the end user may transmit data on the data bus and transmission disable intervals, whereby the end user may not transmit data on the data bus, whereby the arbiter is configured to monitor data being transmitted on the data bus and to reset the cycle intervals in response to detection of a predetermined identifier in the data being transmitted.

2. The system of claim 1, whereby the cycle is controlled by one or more timers in the arbiter.

3. The system of claim 2, wherein the cycle is controlled by a first timer to time the disable interval and a second timer to time the activation interval.

4. The system of claim 1, whereby the arbiter can be enabled and/or reset by the end user.

5. The system of claim 4, whereby the arbiter communicates with the end user by sending a signal indicating whether the bus arbiter enables or disables transmission from the end user.

6. The system of claim 1, wherein the arbiter is configured to respond to a plurality of different predetermined identifiers in the data being transmitted.

7. The system of claim 1, wherein the end users include passive and/or active end users.

8. The system of claim 7, wherein for an active end user, an identification signal is generated by the end user and for a passive end user, an identification signal is generated by the bus arbiter.

9. The system of claim 1, whereby the arbiter is configured to store data to be transmitted, in a buffer until a transmission enable interval for the associated end user.

10. The system of claim 1, wherein the end users include one or more smart sensors.

11. The system of claim 1, wherein the system includes an avionics system.

12. A method of serial data communication for time multiplexed transmission of data from a plurality of end users, whereby, for each end user, a respective associated arbiter determines a cycle of transmission enable intervals whereby the end user may transmit data on the data bus and transmission disable intervals whereby the end user may not transmit data on the data bus; and
monitoring all data being transmitted on the data bus and resetting cycle intervals for an end user by its associated arbiter in response to detection of a predetermined identifier in the data being transmitted.

13. The method of claim 12, further comprising storing data to be transmitted, in a buffer in an arbiter until a transmission enable interval for the associated end user.

* * * * *